Dec. 20, 1966  G. A. TINNERMAN ETAL  3,292,479
SNAP SOCKET FASTENER
Filed Nov. 19, 1964
FIG. 1
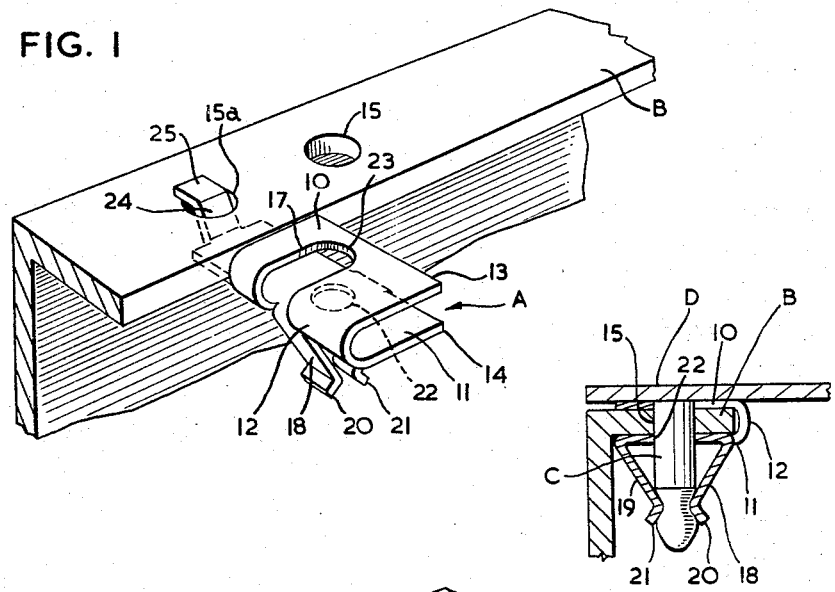
FIG. 3
FIG. 2
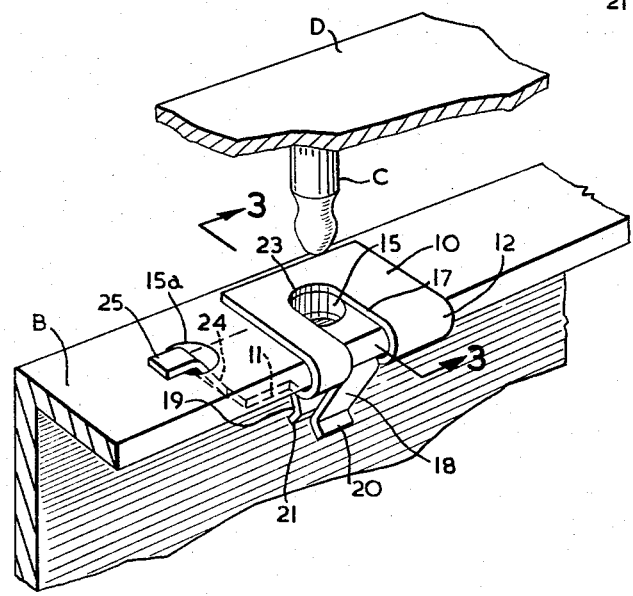
INVENTORS
GEORGE A. TINNERMAN
HENRY C. TINNERMAN
BY: *Featherstonhaugh & Co.*
ATTORNEYS

United States Patent Office 3,292,479
Patented Dec. 20, 1966

3,292,479
SNAP SOCKET FASTENER
George A. Tinnerman, 17864 Beach Road, Lakewood, Ohio, and Henry C. Tinnerman, Fort Lauderdale, Fla.; said Henry C. Tinnerman assignor to George A. Tinnerman, Lakewood, Ohio
Filed Nov. 19, 1964, Ser. No. 412,518
2 Claims. (Cl. 85—7)

This invention relates to fasteners adapted to secure an axially projected pin and attachment to plate-like structural members.

The invention is directed to the communications industry in respect to the enclosure of switch gear, etc. and is readily illustrated in its particularly adapted capacity for fastening panels to structural members but is not necessarily limited to this subject matter. The fastening of panels to a chassis or frame structure without the fastening means appearing on the outer face of the panel is desired in various fields as, for instance, in the electrical and communications field. Heretofore this has generally been achieved by means of screw threaded studs passing through such panels to anchor in orifices provided to receive them. In some instances the structural members are required to have pairs of orifices in longitudinally spaced apart relation to one another to adapt them to particular fastening requirements, and which are required to be maintained as standard.

Preferably, however, it has become a desire to attach panels or the like to such structural members without the exterior appearance of fastening means as well as to simply fastening in the direction of a snap fastening if possible.

The present invention provides a fastener which with said standard requirements of orificing or otherwise may be quickly applied and which will receive and retain a pin axially projected into engagement therewith as to secure a panel or like member provided with a plurality of such pins properly located to project from its reverse side and adapted to be projected into a plurality of fasteners of the present invention located on structural members to receive them. Of course, the fastener of the present invention will also function singly when so mounted to receive a pin of an element to be attached to a structural mounting member.

The invention, therefore, is generally directed to a fastener for purposes of this kind comprised by a body formed from a single strip of sheet metal bent upon itself to provide an inner base section and an outer top section underlying and overlying one another, respectively, in spaced apart relation joined along one side by an integral side wall, and each terminating at the opposite side thereof in a free edge, said spaced apart sections forming a channel therebetween accessible along the free edges of said sections and adapted to receive therebetween the edge of a plate-like structural mounting member, said top section having a strip struck therefrom to form an opening therein, said strip continuing through said side wall to said base section and being bent to project as a finger outwardly beyond said base section, said base section having a second finger integrally connected thereto adjacent its free edge and transversely aligned with said first finger, said second finger being bent to project outwardly beyond said base section complementary to said first finger to form therewith a snap socket unit to receive and secure a pin element of a part to be attached to said fastener, said base element being formed with an aperture between said fingers and aligned with said opening in said top section whereby when said fastener is caused to straddle an edge of an orificed plate-like structural member having said orifice aligned with the opening in said top section and the aperture in said base section, said pin element of said part to be attached may be axially projected into said snap socket unit securing said part to be attached to said plate-like structural element while retaining said fastener from dislodgement therefrom.

The invention will be clearly understood by reference to the following specification taken in conjunction with the accompanying drawings, in which:

FIG. 1 is a perspective illustration of the fastener of the present invention located in initial position on a dually orificed plate-like structural member (shown fragmentarily) about to be swung into finally attached position.

FIG. 2 is a similar perspective view showing the fastener swung into final set position and illustrating fragmentarily a panel member with a pin on one side registering with the securing portion of said fastener and an opening in said structural member; and FIG. 3 is a fragmentary section taken substantially along the line 3—3 of FIG. 2.

Referring to the drawings, A indicates the fastener as a whole formed from a strip of sheet steel (ultimately hardened) bent upon itself to provide the overlying and underlying top section 10 and base section 11, respectively, in spaced apart relation joined at one side edge by the integral wall 12 and terminating at the other side edges in the free edges 13 and 14, respectively. The space between said section provides an open channel accessible from the free edges of said sections to receive therebetween a plate-like structural element B (such as a flange of a structure) upon the edge of which the fastener is adapted to be mounted. Such structural members are at least orificed as at 15 and in some cases are provided with pairs of uniformly spaced apart orifices as standard practice, i.e. orifices 15 and 15a.

Dealing first of all with the requirement of only one orifice in the structural member B, the basic structure of the fastener provides for striking from the top outer section 10 a strip to form an opening 17 therein, said strip being continued through said side wall 12 and bent to project as a finger 18 outwardly from and beyond the base section 11. The base section 11 is also formed with a finger 19 projecting from its free edge at a point transversely aligned with finger 18 and bent outwardly from said base section complementary to said first finger, both being inclined towards one another to terminate in swaged free ends 20 and 21 jointly to form a snap socket for receiving and securing a headed pin, such as C, projecting from the inner surfaces of a panel D. The base section 11 is apertured as at 22 between said fingers 18 and 19 and in axial registry with the inner end 23 of the opening 17 of the outer top section 10. Consequently, when said structural member B is received in the channel between said sections 10 and 11 as to mount the fastener thereon as in FIG. 2 with the opening 17 in outer top section 10 and aperture 22 of base section 11 aligned with orifice 15 in the structural member B, pin C axially projected through this series of openings will become locked by its head in the resilient snap socket formed by the fingers 18 and 19 as shown in FIG. 3, thus securing the element D attached thereto (panel or otherwise) to the structural member B and likewise securing the fastener from dislodgement from such member. Thus in one instance, the use of a plurality of such fasteners in conjunction with a panel having appropriately placed pins C welded or otherwise secured to project from the inner surface thereof, may be fastened to structural members readily and capable of practical release therefrom as may be required.

A particular feature of this invention lies in its further novel adaptability to mounting members formed with (standard) spaced apart orifices. In this regard, the base section 11 is preferably extended at one end beyond the top outer section 10 as at 23 (for purposes of stability) and in any case is provided with an arm 24 projecting longitudinally therefrom and bent to incline upwardly to the plane of outer top section 10 and provided with an offset terminal end 25 substantially in the plane of section 10. The length of arm 24 is chosen in relation to the spacing of the orifices 15 and 15a of structural member B such that upon inserting the free offset end 25 of arm 24 in orifice 15a, as per FIG. 1, arm 24 becomes a pivot arm for the fastener as to assure that its opening 17 in section 10 adjacent its inner end 23 and registering aperture 22 in its section 11 will register automatically with orifice 15 in structural member B when said fastener is swung from the position of FIG. 1 to that of FIG. 2.

In either concept, therefore, the fastener of the present invention, of simple one piece form, is adapted by simple engagement with a structural member to releasably lock an axially projected pin and such element applied carried thereby to a structural member (or members) while automatically locking said fastener to said structural member. Obviously such fastener is capable of economic production and by automation.

What we claim as our invention is:

1. A fastener applicable to the edge of plate-like structural members and adapted to receive and secure an axially projected stud, comprising a body formed from a single strip of sheet metal bent upon itself to provide an inner base section and an outer top section underlying and overlying one another respectively in spaced apart relation joined along one side by an integral side wall, and each terminating at the opposite side thereof in a free edge, said spaced apart sections forming a channel therebetween accessible along the free edges of said sections and adapted to receive therebetween the edge of a plate-like structural mounting member, said top section having a strip struck therefrom to form an opening therein, said strip continuing through said side wall to said base section and being bent to project as a resilient finger outwardly beyond said base section, said base section having a second resilient finger integrally connected thereto adjacent its free edge and transversely aligned with said first finger, said second finger being bent to project outwardly beyond said base section complementary to said first finger, a snap socket unit to receive and secure a stud element of a part to be attached to said fastener, said base element being formed with an aperture between said fingers and aligned with said opening in said top section whereby when said fastener is caused to straddle an edge of an orificed plate-like structural member having said orifice aligned with the opening in said top section and the aperture in said base section, both said fingers being inclined toward each other in the direction away from said base section with the free ends of said fingers being bent outwardly in opposite directions, the minimum distance between said fingers being less than the maximum transverse dimension of said aperture, said stud element of said part to be attached may be axially projected into said snap socket unit securing said part to be attached to said plate-like structural element while retaining said fastener from dislodgement therefrom.

2. A fastener as claimed in claim 1 in which said base element is formed with an arm projecting longitudinally therefrom bent to dispose a terminal end thereof in a plane substantially parallel to the plane of said outer top section and locatable in a second orifice in said structural element aligned with and spaced longitudinally from said first mentioned orifice therein, said arm extending from an end edge of the base element and being of a length substantially corresponding to the distance between said orifices in said structural element and of a width less than that of the base element, the terminal end of said arm lying generally within the same plane as the plane of the top section whereby when said terminal end of said arm is inserted in said second orifice, said arm forms a pivot for said fastener to swing it into straddle engagement with said structural element with said orifice in the top element and said aperture in said base element aligned with the first orifice in said plate-like structural element.

References Cited by the Examiner
UNITED STATES PATENTS

| | | | |
|---|---|---|---|
| 2,552,499 | 5/1951 | Tinnerman | 151—41.75 |
| 2,668,998 | 2/1954 | Tinnerman | 24—127 |
| 2,697,862 | 12/1954 | Flora | 151—41.75 |

CARL W. TOMLIN, *Primary Examiner.*

R. S. BRITTS, *Assistant Examiner.*